(12) United States Patent
Parke et al.

(10) Patent No.: US 6,466,636 B1
(45) Date of Patent: Oct. 15, 2002

(54) DECONTAMINATION METHOD

(75) Inventors: John Michael Parke, Kennewick, WA (US); Thomas J. Gammon, Richland, WA (US); David W. Wilson, Pasco, WA (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 09/915,752

(22) Filed: Jul. 26, 2001

Related U.S. Application Data

(60) Provisional application No. 60/221,353, filed on Jul. 26, 2000.

(51) Int. Cl.$^7$ .............................................. G21C 19/30
(52) U.S. Cl. ...................... 376/260; 376/309; 376/310; 488/1
(58) Field of Search .................... 376/310, 203, 376/204, 260, 309; 488/1

(56) References Cited

U.S. PATENT DOCUMENTS

| | | | |
|---|---|---|---|
| 4,587,043 A | * | 5/1986 | Murray et al. ................. 134/27 |
| 4,942,594 A | * | 7/1990 | Bertholdt et al. ............... 134/2 |
| 5,024,805 A | * | 6/1991 | Murray ........................ 376/305 |
| 5,073,333 A | * | 12/1991 | Arvesen ...................... 376/305 |
| 5,089,216 A | * | 2/1992 | Schlonski et al. ........... 376/298 |
| 5,132,076 A | * | 7/1992 | Corpora et al. ............. 376/305 |
| 5,305,360 A | * | 4/1994 | Remark et al. .............. 376/309 |
| 5,625,658 A | * | 4/1997 | Lin .............................. 376/306 |
| 5,742,654 A | * | 4/1998 | Morris ........................ 376/306 |

* cited by examiner

Primary Examiner—Michael J. Carone
Assistant Examiner—Daniel Matz

(57) ABSTRACT

A boiling water reactor having a reactor pressure vessel with two recirculation loops hydraulically connected thereto is decontaminated by installing plugs in the outlets of jet pump ram's head manifolds located within the reactor pressure vessel to isolate the recirculation loops from the reactor pressure vessel. A monitoring gas is bubbled into some of the ram's head manifolds through the plugs to monitor the process pressure within the manifolds and riser pipes connected with the manifolds. The level of the decontamination solution in the riser pipes can be determined by determining the differential pressure due to the vertical height of the decontamination solution in the loops.

11 Claims, 3 Drawing Sheets

DECONTAMINATION METHOD

CROSS-REFERENCE

This application claims the benefit of Provisional Patent Application No. 60/221,353, filed Jul. 26, 2000.

BACKGROUND OF THE INVENTION

The invention relates to a method for decontaminating a boiling water nuclear reactor employed to generate electric power and more particularly to a method for decontaminating one or more external recirculation loops hydraulically connected with a reactor pressure vessel without decontaminating the reactor pressure vessel.

During on-line power generating operations of commercial boiling water nuclear reactors, thin metal oxide layers or films tend to build up on the internal surfaces of the reactor pressure vessels and appurtenant subsystems in contact with recirculating coolant water. These reactors commonly have at least one and generally two special piping subsystems, commonly referred to collectively as a "reactor recirculation system" (or "RRS") and individually as "recirculation loops" (or "loops"), piped in parallel with each other and hydraulically connected to a reactor pressure vessel to assist the recirculation of the coolant water inside the reactor pressure vessel during power generation. Activated metal ions from the central core regions within the reactor pressure vessels tend to dissolve in the high velocity recirculating coolant water and then to become absorbed in the metal oxide layers throughout the balance of the reactor system, which tends to raise the overall radiation levels throughout the entire reactor system.

Later, during periodic scheduled outages, it is desirable to reduce the general radiation levels within containment buildings in which the nuclear reactors are contained to reasonably achievable levels in order to reduce the potential exposure of personnel working within the buildings during the periodic outages. The nuclear industry has developed various dilute chemical decontamination treatments, e.g., commercial treatments such as AP-Citrox, AP-AC, CAN-DEREM, LOMI and the like, for dissolving the metal oxide layers and thereby reducing radiation levels of boiling water reactors and pressurized water reactors. Conventionally, these decontamination processes involve the addition of an oxalate, a citrate, EDTA, low oxidation state metal ion and the like to the coolant water to form decontamination solutions, which are then pumped throughout the portions of the reactor system to be decontaminated to dissolve and solubilize the activated ions absorbed in the oxide layers. The metal ions are then removed from the decontamination solutions on ion exchange resins. In addition, particulate oxides from the layers may be entrained by the decontamination solutions and then removed on filters. See, generally, M. E. Pick et al., "Chemical Decontamination Of Water Reactors. CEGB Developments And The International Scene", Nuclear Energy, Vol. 22, No. 6, pp. 433–444 (December 1983).

In full loop decontamination processes, only the external recirculation loops hydraulically connected with the reactor pressure vessels of boiling water reactors are normally decontaminated. Decontamination of the loops is desirable because the portions of the reactors located outside of the reactor pressure vessels tend to be major contributors to the radiation dose rates in the containment buildings. It is frequently not necessary to decontaminate the internal portions of the reactor pressure vessels because the radiation levels within the reactor pressure vessels, although very high, do not contribute to the dose rates in the general vicinity of the containment buildings where the maintenance personnel and their equipment will be located. Also, it is frequently not desirable to decontaminate the internal portions of the reactor pressure vessels in order to reduce the amount of radioactive material that is handled and eventually removed and stored.

Prior to performing a chemical decontamination of a particular portion of a system, the subsystem or component to be decontaminated is normally isolated from the balance of the system in order to confine the decontamination solution to the desired portion of the system. Thus, in accordance with known and proposed prior practices for performing full loop decontaminations without decontaminating the hydraulically connected nuclear pressure vessels, the loops may be isolated from the reactor pressure vessels by one of three preliminary methods: (1) removing all of the nuclear fuel from the reactor pressure vessels and then draining the reactor pressure vessels down to levels where the water levels are below the levels of the nozzles in the reactor pressure vessels connected with the external loop piping; (2) installing specially designed cross-connections (sometimes referred to as "jumpers") between the internal jet pump risers within the reactor pressure vessels; or (3) installing plugs into the reactor pressure vessel nozzles connected with the external loop piping.

Of these three preliminary methods for isolating the loops from the reactor pressure vessels, the use of plugs in accordance with preliminary method (3) is often the method of choice because it has much less impact on reactor outage critical path time and results in the least personnel exposure of personnel to radiation. However, during the course of the subsequent loop decontamination steps when the decontamination solutions are pumped through the loops, the levels of the decontamination solutions should be closely monitored in order to determine whether the decontamination solutions have sufficiently washed the irradiated surfaces of, and thereby effectively decontaminated, the loop piping. A lack of effective methods for monitoring the decontamination solution levels inside the loop piping and the inability to establish reliable vent paths for the gases trapped within the loops adjacent the plugs has caused prior loop decontamination processes performed with plugged nozzles to be significantly less effective than decontamination processes performed with the other two preliminary methods.

SUMMARY OF THE INVENTION

It is an object of the present invention to provide a method for decontaminating the recirculation loops of boiling water reactors that will permit workers to monitor the levels of decontamination solutions in loops isolated by plugs from reactor pressure vessels with greater accuracy than was provided in prior loop decontamination practices. It is a further object to provide a decontamination method that will provide a reliable vent path for the gases trapped inside the plugged loop piping.

With these objects in view, the present invention resides in a method of decontaminating a boiling water reactor comprising at least one recirculation loop having a plurality of recirculation pipes piped in parallel and hydraulically connected with a reactor pressure vessel. In the general practice of the present invention, plugs are installed on the outlets of a jet pump ram's head manifold connected with a riser pipe extending from a reactor pressure vessel nozzle connected with one of the parallel recirculation pipes in the recirculation loop. Preferably, the outlets of all of the manifolds in the recirculation loop are plugged.

A monitoring gas is introduced into the ram's head manifold through one of the plugs installed therein for monitoring the pressure in the manifold connected with the riser pipe. The level of a decontamination solution in the recirculation loop is determined from the pressure of the monitoring gas in the manifold connected with the riser pipe. The monitoring gas need only be introduced into one of the loops through one of the outlets of one of the ram's head manifolds in the loop. However, it is preferable to introduce monitoring gas through the outlets of at least two manifolds in each of the loops.

Advantageously, the monitoring gas may be introduced into the manifold by a suitable commercially available level/pressure monitoring system such a gas bubbler. This type of monitoring system can sense the pressure and change in pressure of the monitoring gas introduced into a space and provide a corresponding signal to a programmable logic controller or other calculating device. Based upon signals indicating the pressure of the monitoring gas in the manifold (and the pressure of the monitoring gas introduced into the loop at a lower location), the controller can calculate the level of the decontamination solution in the loop from the differential pressure due to the height (or head) of the decontamination solution in the loop.

In preferred practices where the monitoring gas is introduced into one or more manifolds in accordance with the present invention, the decontamination solution may be pumped in, into or out of the riser pipes while the monitoring gas is being introduced into the ram's head manifolds. In one preferred practice, the decontamination solution may be sloshed in the risers while introducing the monitoring gas into the ram's head manifolds. In preferred practices of the present invention in connection with boiling water reactors (such as commercial boiling water reactors for generating electric power) having at least two recirculation loops, the decontamination solution may be pumped from one of the two loops to the other of the two loops while introducing the monitoring gas into the ram's head manifold(s) of one or both loops.

In a preferred practice of the present invention where it is desired to provide a reliable venting path from a ram's head manifold, the monitoring gas is vented from the ram's head manifold through one of the plugs installed therein. Preferably, the monitoring gas is introduced into the manifold through one plug and then vented through the other plug in the manifold. Advantageously, the monitoring gas and the gas trapped in the manifold when the decontamination solution is pumped or sloshed through the riser pipes and the balance of the loop may vent through the plug. Most preferably, each of the manifolds in a loop will have a vent for venting the monitoring gases. Also, the gases may be vented while the decontamination solution is being pumped or sloshed in a loop or between loops.

In a preferred practice of the present invention where one or more of the manifolds are vented, a vacuum is pulled on the manifolds. Advantageously, a vacuum will suck any water trapped in the plugged outlets of the manifolds that would prevent the flow of gas from the manifolds.

In a preferred practice of the present invention where it is desired to determine the level of the decontamination solution in the suction piping of a recirculation pump in the loop, a plug is installed in a reactor vessel nozzle connected with a suction pipe extending to the suction connection of the recirculation pump. A monitoring gas is introduced through the plug in the suction pipe extending to the suction connection of the recirculation pump for monitoring the pressure in the suction pipe connected with the suction connection of the recirculation pump. The level of the decontamination solution in the suction pipe extending to the suction connection of the recirculation pump is determined from the pressure of the monitoring gas introduced through the plug in the reactor vessel nozzle into the suction pipe extending to the suction connection of the recirculation pump.

BRIEF DESCRIPTION OF THE DRAWINGS

The invention as set forth in the claims will become more apparent from the following detailed description of certain preferred practices thereof, which may be performed in boiling water reactors shown, by way of example only, in the accompanying drawings, wherein:

DESCRIPTION OF THE PREFERRED PRACTICE

Figure 1:
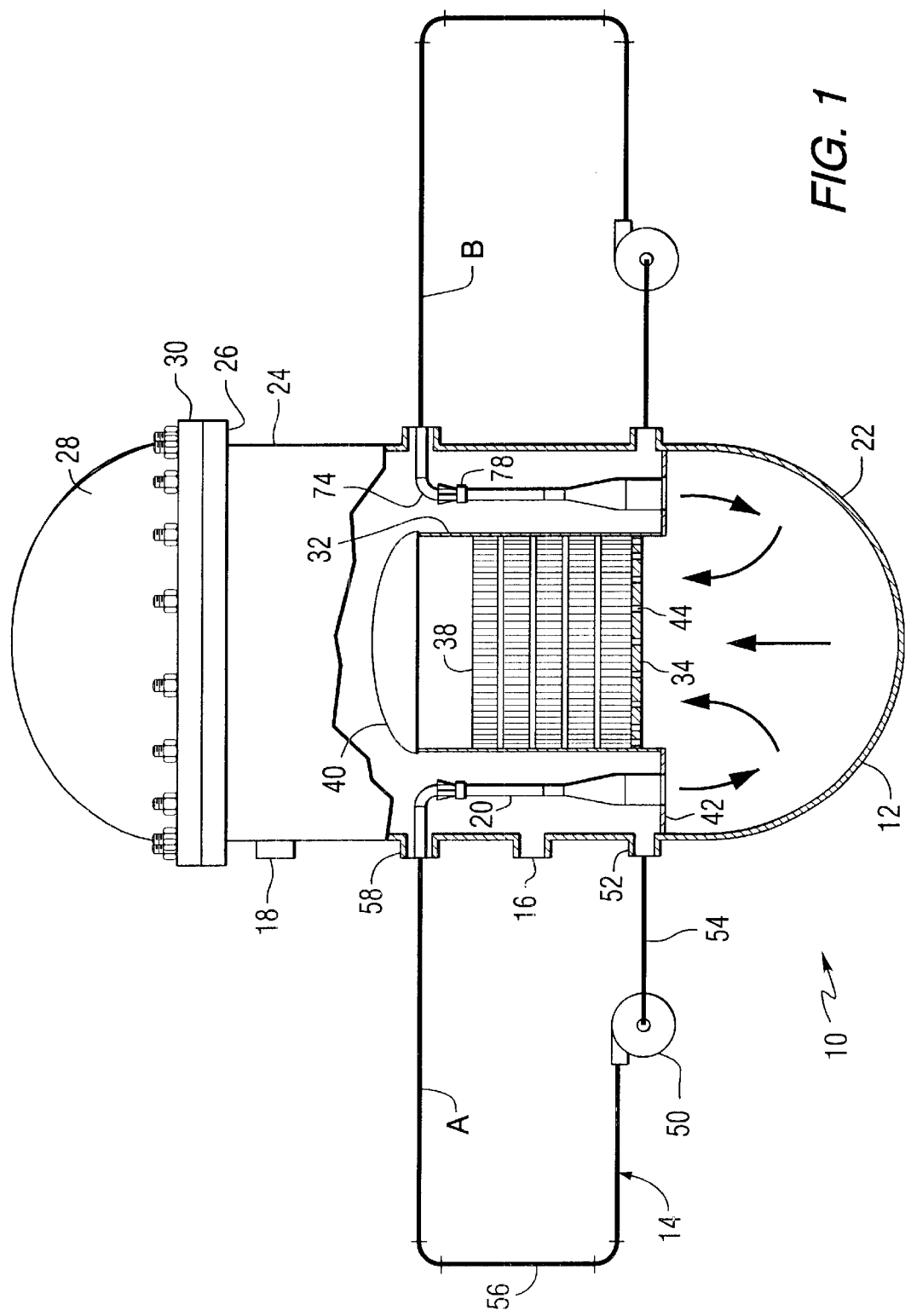
FIG. 1 is a schematic representation of a boiling water reactor characterized by a reactor pressure vessel, which has been partially cut-a-way to show its significant internal structures including a plurality of jet pumps in fluid flow communication with two external reactor recirculation loops.

Referring now to the drawings in detail and in particular to FIG. 1 there is generally illustrated a boiling water reactor 10 of a commercial nuclear power plant for generating electricity. The nuclear reactor 10 is generally characterized by a reactor pressure vessel 12 and by a RRS 14. The RRS has two substantially identical recirculation loops A and B hydraulically connected in parallel with each other and in series with the reactor pressure vessel 12.

During on-line electrical power generation, coolant water (high purity water containing parts per million or lower levels of various ions and, in some cases, dissolved hydrogen gas) is pumped by feedwater pumps (not shown) from a turbine-generator unit (not shown) in a closed loop into the reactor pressure vessel 12 through an inlet nozzle 16 and steam is generated within the reactor pressure vessel 12. The steam flows out of the pressure vessel 12 through an outlet nozzle 18 back to the turbine-generator unit. The reactor recirculation loops A and B provide high velocity coolant water to a plurality of jet pumps 20 located within the reactor pressure vessel 12 for facilitating the flow of coolant water within the pressure vessel 12.

As FIG. 1 shows, the reactor pressure vessel 12 includes a bottom head 22 with a sidewall 24 extending vertically to a flange 26. A removable head 28 has a flange 30 that may be bolted to the reactor pressure vessel flange 26. The reactor pressure vessel 12 has a core shroud 32 and a core plate 34, which define a central core region for containing removable fuel assemblies 38. The core shroud 32 has a removable upper end 40 that may be removed in order to remove the fuel assemblies 38. The pressure vessel wall 24, core shroud 32 and ring member 42 define an annulus region surrounding the central core region. The reactor pressure vessel bottom head 22 and the core plate 34 define a lower internals region which is in fluid flow communication with the central core region via flow holes 44 in the core plate 34.

Figure 3:
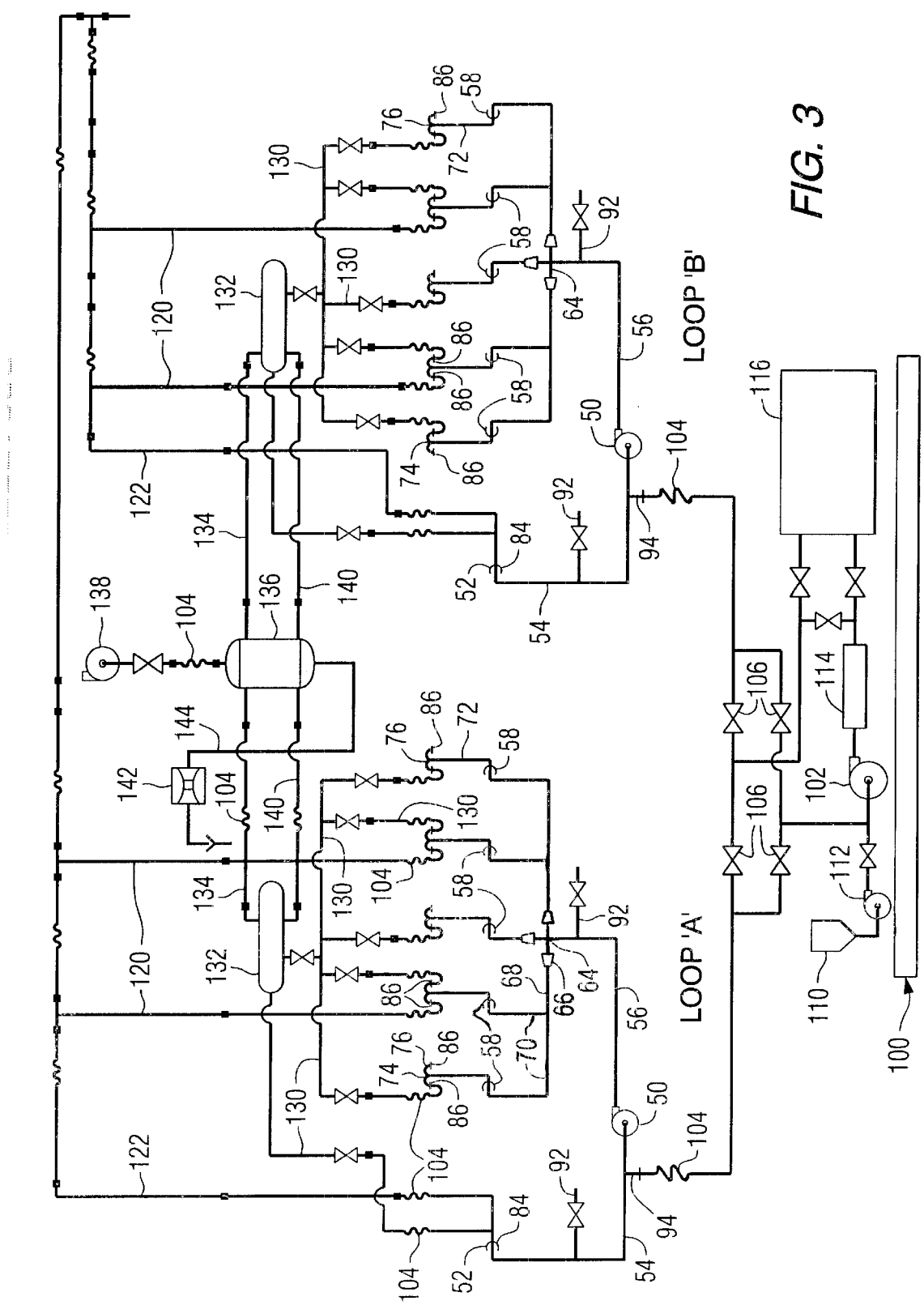
FIG. 3 is a schematic representation of the two reactor recirculation loops of the boiling water reactor pressure vessel of FIG. 1 modified to facilitate a full loop decontamination.

As FIG. 1 also shows, each reactor circulation loop A,B of the reactor circulation system 14 generally includes a centrifugal pump 50 having a pump suction nozzle and a pump discharge nozzle. The pumps 50 of commercial boiling water reactors may have nominal capacities of up to about 100,000 gallons per minute or more and the pump nozzles may have diameters of up to about 28 inches or more. Each pump suction nozzle is connected by suction piping 54 with a nozzle 52 in the pressure vessel wall 24 for fluid flow connection with the annulus region of the pressure vessel 12. In another commercial boiling water reactor design (not shown), the vessel nozzle 52 may connect the suction piping 54 with the lower internals region of a reactor pressure vessel. The discharge nozzle of each centrifugal pump 50 is connected by discharge piping 56 to a plurality of reactor pressure vessel nozzles, illustrated in FIG. 1 by nozzle 58. As is illustrated in FIG. 3, the discharge piping 56 comprises at least one manifold 64 with pipe reducers 66 which divide each loop A,B into parallel branches 68. In addition, the branches 68 may further subdivide each loop A,B into parallel pipes 70. In any event, each pipe 70 extends to one of the vessel nozzles 58.

Figure 2:
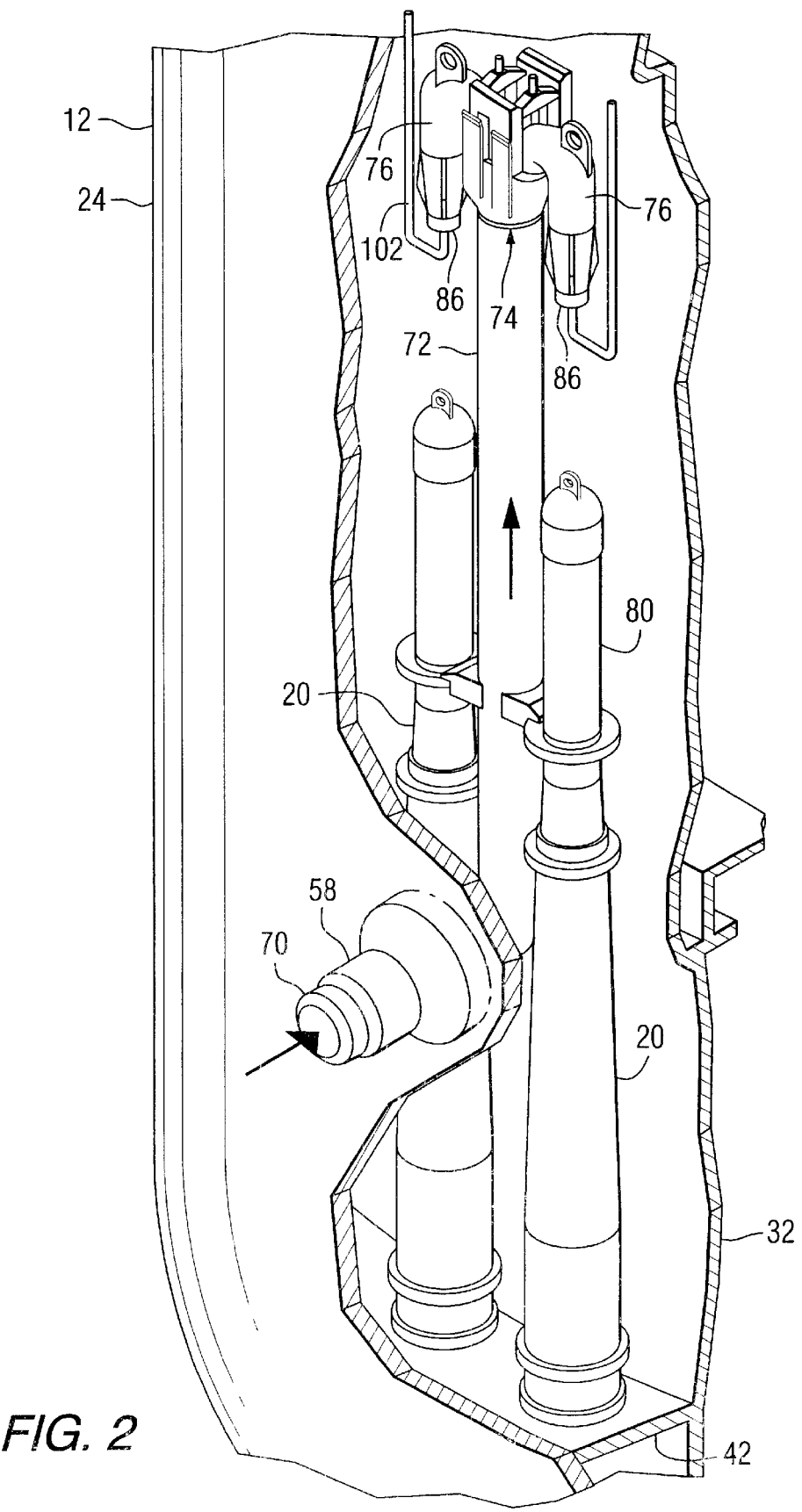
FIG. 2 is a partial perspective schematic representation of the boiling water reactor pressure vessel of FIG. 1 which has been cut-a-way to show a conventional jet pump assembly arrangement that has been modified to facilitate a full loop decontamination.

As is best shown in FIG. 2, each reactor pressure vessel nozzle 58 extends to a riser pipe, illustrated by riser pipe 72, in the annulus region of the reactor pressure vessel 12. Each riser pipe 72 extends upwardly to a ram's head manifold 74 having two 180° piping bends 76 disposed in parallel adjacent a pair of downstream jet pumps 20. It should be noted that FIG. 2 shows a jet pump assembly that has been modified to facilitate a full loop decontamination during a scheduled outage in accordance with the practice of the present invention. As shown, the piping bends 76 have been sealed with plugs 86, the jet pump inlet sections 78 (shown in FIG. 1) of the jet pumps 20 have been removed and the remaining portions 80 of the jet pumps 20 have been capped.

After generating electric power during on-line operations for a year or more, commercial nuclear reactors exemplified by nuclear reactor 10 are taken off-line for refueling and/or performing scheduled maintenance or repairs. It is often desirable to first decontaminate the recirculation loops A and B but not the internal regions of the reactor pressure vessels 12 in order to reduce the radiation levels in the containment building before performing the scheduled maintenance or repairs.

In a preferred practice in accordance with the present invention, a boiling water reactor 10 having a reactor pressure vessel 12 with two recirculation loops A,B piped thereto is decontaminated by: installing plugs 86 on both outlets of the jet pump ram's head manifolds 74 in both of the recirculation loops A,B; pumping a decontamination solution in the loops A,B to wash the irradiated oxide layers on the piping surfaces; introducing compressed air, nitrogen or other monitoring gas into selected ram's head manifolds 74 in the loops A,B through one of the plugs 86 for monitoring the pressure of the process in the manifolds; and determining the level of the decontamination solution in the recirculation loops A,B from the pressure of the monitoring gas in the manifolds 74. The preferred practice of the present invention may also include the additional steps of installing additional plugs 84 in the reactor vessel nozzles 52 connected with the suction pipes 54 extending to the suction connections of the recirculation pumps 50 in the recirculation loops A,B before pumping the decontamination solution into the loops A,B; introducing a monitoring gas through the plugs 84 into the suction pipes 54 for monitoring the monitoring gas pressure in the suction pipes 54; and determining the level of the decontamination solution in the suction pipes 54 from the pressure the monitoring gas introduced through the plugs 84.

FIGS. 2 and 3 generally shows the recirculation loops A,B isolated from the reactor pressure vessel 12 by plugs 84 installed in the pressure vessel nozzles 52 connected with the suction piping 54 and by other plugs 86 installed in the outlets of the 180° bends 76 of the ram's head manifolds 74. As FIG. 3 illustrates, the pressure vessel nozzles 52 and their installed plugs 86 are located below the ram's head manifolds 74 and their installed plugs 86. In commercial boiling water nuclear reactors, the pressure vessel nozzles 52 may be up to about ten feet or more below the ram's head manifolds 74. The plugs 84 and 86 may be round aluminum or stainless steel plugs with inflatable rubber bladders. The plugs 84 and 86 may be installed by tooling operated by robots (not shown) working in the annulus region of the pressure vessel 12 after the reactor pressure vessel head 28 has been removed. It should be noted that the plugs 84,86 are installed while the reactor pressure vessel 12 is submerged in water. Accordingly, the loops A,B are solid with water after they have been isolated. Also, the loops A,B may be isolated from the nuclear reactor's residual heat removal system by closing the valves in piping 92.

In the preferred decontamination practice, a pumping unit such as a skid mounted decontamination unit 100 having a pump 102 as shown in FIG. 3 may be connected with the loops A,B at decontamination flanges 94 located near the suction connections of the recirculation pumps 50 for pumping the decontamination solution in the loops A,B. It is to be noted at this point that the decontamination solution is usually pumped through the recirculation pumps 50, which are not used because they are too big to be useful during a decontamination process. Flexible piping sections 104 may be used to facilitate the temporary connection of piping extending from the decontamination unit 100 with the decontamination flanges 94 of the loops A,B. In addition, the decontamination unit 100 may have valves 106 and associated piping that will permit the skid mounted pump 102 to pump the decontamination solution from one loop A,B to the other loop A,B. The arrangement of valves 106 shown in FIG. 3 advantageously permits the flow of decontamination solution to be reversed as often as is desired. In addition, in other practices of the present invention, jumper connections (not shown) may be employed to connect the manifolds 86 of one loop A,B with the manifolds 86 of the other loop A,B so that the skid mounted pump 102 may be employed to continuously recirculate the decontamination solution through the loops A,B.

In the preferred practice of the present invention, both loops A,B may be isolated by plugging as described above and then drained down to an intermediate level. For example, the loops A,B may be drained down to a level where the RRS 14 is about half full. The volume in the loops A,B between the plugs 84, 86 and the fluctuating liquid levels of the decontamination solution in the loops A,B may be back filled by air, nitrogen or other suitable gas and vented through connections in the plugs 84,86 described below. Preferably, the pressure above the liquid levels of the decontamination solution throughout the RRS 14 are substantially equalized and nominally about atmospheric pressure throughout the decontamination process in this practice.

As shown in FIG. 3, the decontamination unit 100 may also have a feed tank 110 and a feed pump 112 for feeding a suitable decontamination solvent or mixture of solvents (preferably diluted as an aqueous solution) to the suction side of the skid mounted pump 102. The skid mounted pump 102 may then mix the solvent with the coolant water within the pump body and pump the diluted solvent and at least some of the coolant water in one of the two loops A,B into the other of the two loops A,B, including the riser pipes 72. Thus, for example, the pump 102 first may pump some of the coolant water from loop A and the diluted solvent from feed tank 110 into loop B. Later, the valves 106 may be reversed and the skid mounted pump 102 may pump the decontamination solution from the loop B back to loop A. Advantageously, the energy input from the skid mounted pump 102 may also cause the decontamination solution to slosh and splash against the oxide layers on the surfaces of the piping of the recirculation loops A,B and the riser pipes 72.

As is also shown in FIG. 3, the skid mounted unit 100 may have a heater 114 for heating the decontamination solution up to a desired operating temperature for effectively dissolving the oxide layers in reasonable time periods. For example, known dilute chemical decontamination processes may be performed at temperatures up to about 150° F. or 180° F. The skid mounted unit 100 may also have ion exchangers represented by ion exchanger 116 for cleaning up the decontamination solution at the end of the decontamination process to remove the decontamination solvents and dissolved ions from the coolant water.

The levels of the decontamination solutions in the loops A,B must be known at all times during the course of decontamination processes to effectively decontaminate the loops A,B without running the risk of pumping the decontamination solvents into the reactor pressure vessels 12. In addition, it is often desirable that the solvents in the decontamination solutions not contact plugs 84 (and particularly aluminum plugs) in the pressure vessel nozzles 52.

In the practice of the present invention, commercial gas bubbling level/pressure monitoring systems (not shown) are used for monitoring the levels of the decontamination solutions in the loops A,B. These monitoring systems actually determine the level of a process liquid at a particular location by sensing a differential pressure due to the vertical height (or static head) of the liquid above a reference level and then calculating the level based upon the differential pressure and the specific gravity of the liquid. Commercially available monitoring devices sense the pressures at various locations in a process by introducing (or, as it is sometimes known in the field, "bubbling") compressed air or nitrogen at known, low flow rates into the process and sensing the pressure of the monitoring gas. Each sensed pressure is converted to an appropriate signal by a transducer and the signal is sent to a programmable logic controller or other suitable calculating device by a pressure transmitter.

In the preferred practice of the present invention, the monitoring systems are employed to sense the pressure within the loops A,B at the plugs 84, 86 and at the decontamination flanges 88 on the suction sides of the recirculation pumps 50, which flanges 88 are physically located low in the drywells of nuclear reactors. Additional monitoring systems may be optionally employed to sense the pressures at other locations. Advantageously, the monitoring systems may be located remotely from the pressure vessel 12 in relatively low radiation level areas, e.g., on the refuel floor, and connected with one or both recirculation loops A,B via small bore monitoring gas sensing lines 120. The monitoring gas sensing lines 120 may extend through the one of the plugs 86 in the bends 76 of the manifolds 74 for introducing the monitoring gas into the manifolds 74 and associated riser pipes 72. Although it may be sufficient to introduce the monitoring gas into only one of the manifolds 74 of one of the loops A,B to determine the level of the decontamination solution, it is preferred to introduce the monitoring gas into at least two of the manifolds 74 in each loop A, B in order to assure the accuracy of the measurement. Similarly, monitoring gas sensing lines 122 may extend through the plug 84 in the reactor pressure vessel nozzle 52 connected with the suction piping 54 for sensing the pressure of the decontamination solution in the suction piping 54 extending to the suction connection of the recirculation pumps 50. As is shown by FIG. 3, the ends of the monitoring gas sensing lines 120, 122 preferably have flexible lengths 104 near the connections with the plugs 86 and 84, respectively.

In the preferred practice of the present invention, the changing gas volumes above the surface levels of the decontamination solution in the loops A,B adjacent the plugs 84,86 and suction pipes 54 are vented by vent lines 130 to reduce the effects of process changes that might substantially affect the back pressure on the monitoring gas sensing lines 120,122 and thereby result in inaccurate sensed pressures. Preferably, for the manifolds 86 that are connected with the monitoring gas sensing lines 120, the monitoring gas is introduced through one plugged outlet of each such manifold 74 and the monitoring gas is vented through the other plugged outlet of the manifold. The vent lines 130 may be small bore hoses, piping or tubing of about ⅜ inch diameter or larger.

As is shown in FIG. 3, the vent lines 130 from the recirculation loops A and B are preferably directed to one of two vent tanks 132 and the vent tanks 132 are vented through vent lines 134 to a vacuum tank 136. Advantageously, this arrangement permits the overpressure on the decontamination solution in the several portions of the loops A,B to be substantially equalized as the decontamination solution is pumped from loop A,B to loop A,B in the course of a decontamination process.

The vacuum tank 136 may be connected with a vacuum pump 138 for pulling a vacuum on the vacuum tank 136 and on the vent lines 130 and 134. Advantageously, the vacuum may be employed to clear any trapped water in the 180° bends 76 of the ram's head manifolds 74. It should be noted that the structure of the 180° bends 76 will inherently trap coolant water on the plugged outlet side at the time the plugs 84,86 are installed. This water will remain trapped even though the level of the coolant water throughout the loops A,B is lowered. Later, during the decontamination process, the decontamination solution may flow over the central portion of the bends 76 and become trapped in the plugged outlets. The accumulation of water in the plugged outlets may be indicated by excessively high indicated pressure levels. In the preferred practice, the vacuum may be periodically employed when the indicated pressure indicates that the vent paths have become blocked. Also, the vent tanks 132 preferably have drain pipes 140 extending to the vacuum tank 136 for draining coolant water and decontamination solution which may have vented into the vent tanks 132. An eductor 142 or other pumping means may be connected by pipe 144 to the vacuum tank 136 for pumping decontamination solution out of the vacuum tank 136. The vent tanks 132, vacuum tank 136, vacuum pump 138 and eductor 142 may be located on the skid mounted unit 100 together with the monitoring system on the refuel floor or at another suitable location remote from the reactor pressure vessel 12. The ram's head manifolds 74 and the vent tanks 110 may be drained on an "as needed" basis whenever the solution begins to block the vent path.

While a present preferred embodiment of the present invention has been shown and described, it is to be understood that the invention may be otherwise variously embodied within the scope of the following claims of invention.

What is claimed is:

1. A method of decontaminating a boiling water reactor comprising at least one recirculation loop having a plurality of recirculation pipes piped in parallel with each other hydraulically connected with a reactor pressure vessel, comprising the steps of:

installing plugs on each of two outlets of a jet pump ram's head manifold connected with a riser pipe extending from a reactor pressure vessel nozzle connected with one of the recirculation pipes in the recirculation loop;

introducing a monitoring gas into the ram's head manifold through one of the plugs installed therein for monitoring the pressure in the manifold connected with the riser pipe; and determining the level of a decontamination solution in the recirculation loop from the pressure of the monitoring gas in the manifold connected with the riser pipe.

2. The method of decontaminating a boiling water reactor of claim 1, including the step of: pumping the decontamination solution in the riser pipe while the monitoring gas is introduced into the ram's head manifold.

3. The method of decontaminating a boiling water reactor of claim 1, including the step of: pumping the decontamination solution into or out of the riser pipe while the monitoring gas is introduced into the ram's head manifold.

4. The method of decontaminating a boiling water reactor of claim 1, including the step of: sloshing the decontamination solution in the riser pipe while the monitoring gas is introduced into the ram's head manifold.

5. The method of decontaminating a boiling water reactor of claim 1, wherein the reactor has two recirculation loops, including the step of: pumping the decontamination solution from one of the two loops to the other of the two loops while the monitoring gas is introduced into the ram's head manifold.

6. The method of decontaminating a boiling water reactor of claim 5, wherein the step of pumping the decontamination solution from one of the two loops to the other of the two loops comprises the step of: recirculating the decontamination solution while the monitoring gas is introduced into the ram's head manifold.

7. The method of decontaminating a boiling water reactor of claim 1, wherein the step of determining the level of the decontamination solution in the loop based upon the pressure of the monitoring gas in the ram's head manifold comprises the step of: determining a differential pressure of a head of decontamination solution in the loop.

8. The method of decontaminating a boiling water reactor of claim 1, including the step of: venting the monitoring gas from the ram's head manifold through one of the plugs installed therein.

9. The method of decontaminating a boiling water reactor of claim 8, wherein the monitoring gas is vented by the step of: venting the gas through one plug in the manifold and the gas is introduced into the manifold through the other plug.

10. The method of decontaminating a boiling water reactor of claim 8, including the step of: pulling a vacuum on the manifold to remove water from the manifold.

11. The method of decontaminating a boiling water reactor of claim 1, including the further steps of:

installing a plug in a reactor vessel nozzle connected with a suction pipe extending to a suction connection of a recirculation pump in the recirculation loop;

introducing a monitoring gas through the plug in the suction pipe extending to the suction connection of the recirculation pump for monitoring the pressure in the suction pipe connected with the suction connection of the recirculation pump; and determining the level of the decontamination solution in the suction pipe extending to the suction connection of the recirculation pump from the pressure the monitoring gas introduced through the plug in the reactor vessel nozzle into the suction pipe extending to the suction connection of the recirculation pump.

\* \* \* \* \*